E. BOLAND.
INSECT DESTROYER.
APPLICATION FILED OCT. 12, 1914.
1,133,357.
Patented Mar. 30, 1915.
2 SHEETS—SHEET 1.
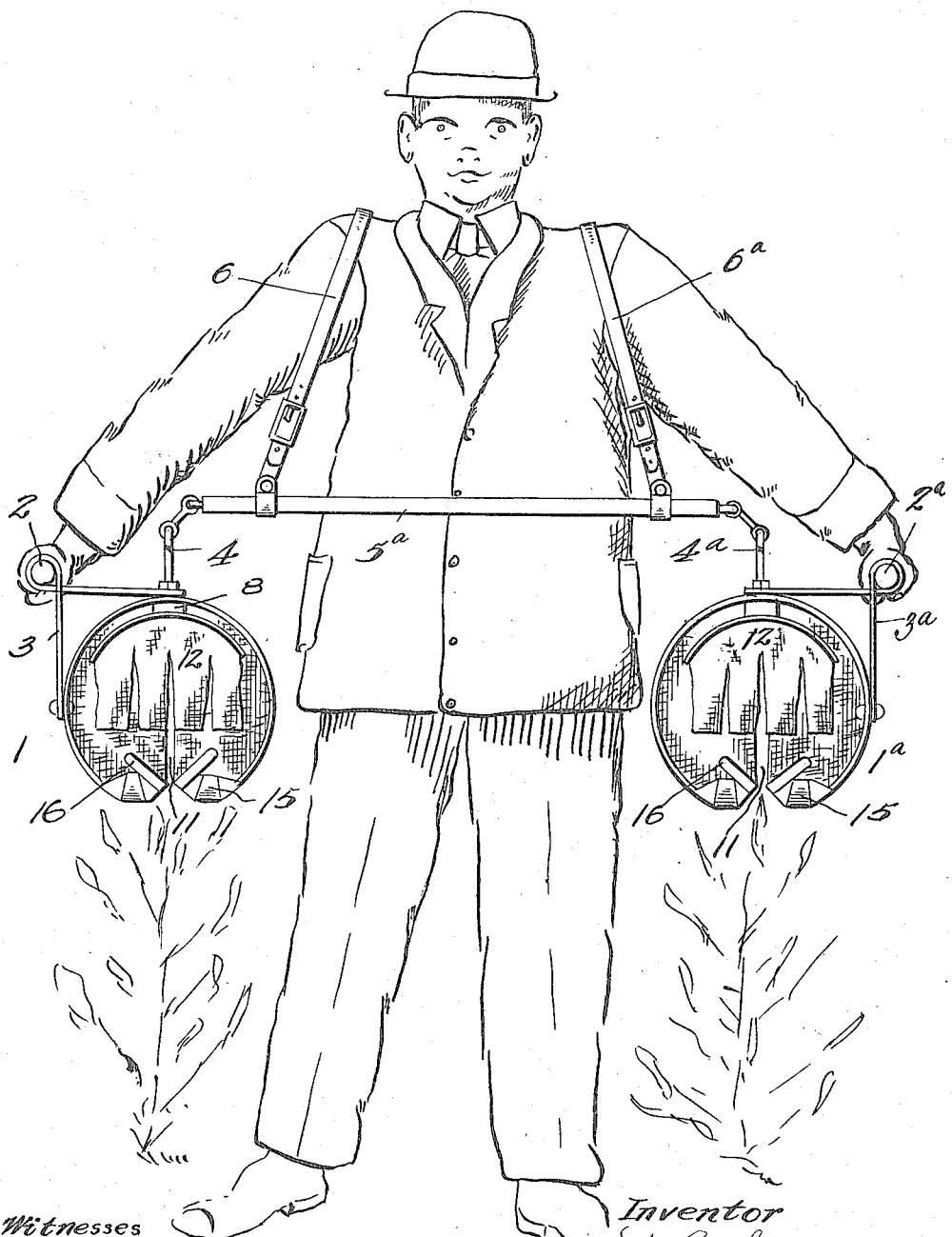

E. BOLAND.
INSECT DESTROYER.
APPLICATION FILED OCT. 12, 1914.
1,133,357.
Patented Mar. 30, 1915.
2 SHEETS—SHEET 2.
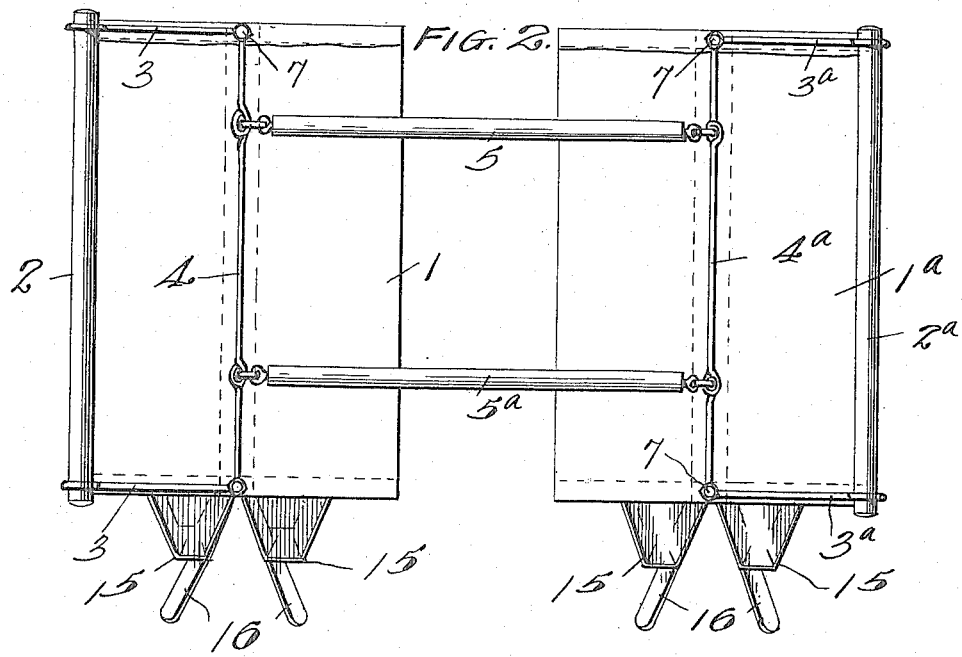
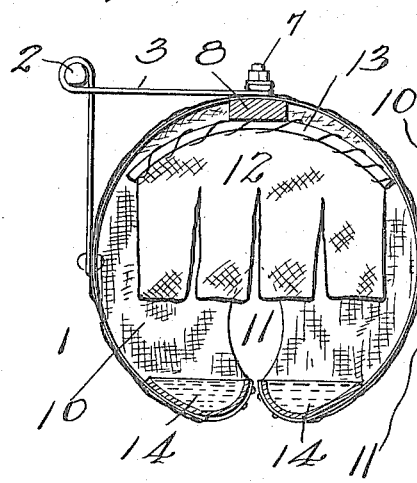
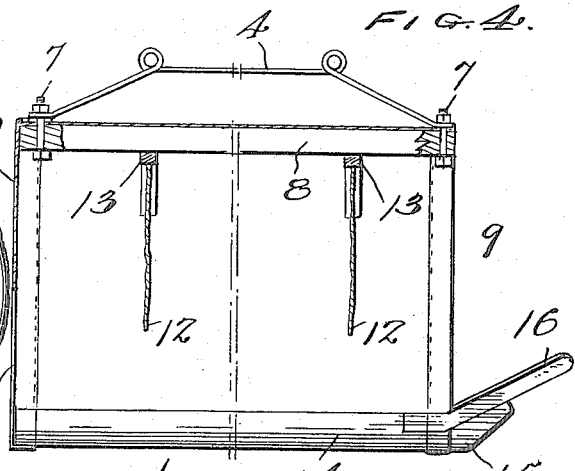

UNITED STATES PATENT OFFICE.

ED BOLAND, OF BIG CREEK, MISSISSIPPI.

INSECT-DESTROYER.

1,133,357. Specification of Letters Patent. Patented Mar. 30, 1915.

Application filed October 12, 1914. Serial No. 866,308.

*To all whom it may concern:*

Be it known that I, ED BOLAND, a citizen of the United States, residing at Big Creek, in the county of Calhoun and State of Mississippi, have invented a new and useful Insect-Destroyer, of which the following is a specification.

My invention relates to improvements in insect destroyers, particularly boll-weevils found in growing cotton, and the objects of my improvements are: first, to detach effectively such weevils from the bolls of growing cotton; second, to provide simple apparatus adjustable on a pedestrian, passing between parallel rows of growing cotton; third, to detach effectively all weevils from the traversed cotton; fourth, to provide for the destruction of such weevils; and fifth, to accomplish these ends with structural simplicity and economy.

I attain these objects by the device illustrated in the accompanying drawings, wherein:

Figure 1 represents a front elevation of a pedestrian having my appliance adjusted to his person, Fig. 2 is a top plan view of the device detached from the operator; Fig. 3 is a transverse, vertical section of one of the hoods; and Fig. 4 is a longitudinal, vertical section thereof.

Similar designations indicate corresponding parts throughout all the views.

Straps 6 6ª are passed over the shoulders of an operator, wherefrom rods 5 5ª depend, having screwed near the ends thereof hinges through which the arms 3 3ª of the bent wires 4 4ª pass, the other termini of which wires form loops encircling the ends of the handles 2 2ª, by which the operator alters the altitude vertically of the twin hoods 1 1ª and whereby the horizontal distance between the hoods can be varied. These hoods are formed by circular frames 9 fastened to the rods 8, 8 by screws 7, 7. Rectangularly to the rods 8, 8 are secured by staples a series of bows 13 wherefrom slitted cloth 12 depends, throughout the interior 10 of the twin hoods. An exit 11 is provided for the bolls that pass through the hoods, after the cloth flaps 12 have mechanically beaten or shaken the cotton by the motion imparted by the passing bolls, so as to detach weevils from the bolls. As the operator passes the cotton the guides 16 impel the bolls to traverse the hoods, and the weevils detached by the flaps 12 fall into pans 14 containing oil, or other destructive agent fatal to the life of a weevil. The pans 14 are upturned at the entrance of the plants by bends 15, serving to prevent loss of oil or weevils.

The operation of my device is obvious, the operator walking between parallel rows of growing cotton, adapts the altitude of the hoods to the cotton, which is guided into the interior of the hoods, where the cloth beaters detach the weevils, that fall into the oil pans and are thus exterminated. The operator can also vary the distance between the hoods horizontally so as to reach irregular rows.

What I claim and desire to secure by Letters Patent is:

The apparatus herein shown and described comprising a yoke member, adapted to be suspended from the shoulders of the operator; the twin hoods mounted thereon having front and rear semi-circular openings for the passage of rows of growing cotton therethrough; stationary flaps suspended from the inner upper surfaces of said hoods, so that the passage of the cotton bolls agitates the flaps rearwardly and the gravitating return motion of the flaps dislodges the weevils from the bolls; oil pans adapted to receive and destroy said weevils; and a link connection, between said hoods and yoke whereby the operator may adjust said hoods to the height of the plant and to the irregularities of the rows, the whole coöperating as and for the purpose set forth and illustrated.

ED BOLAND.

Witnesses:
 R. E. CRUTHIRDS,
 B. L. CARTER.

Copies of this patent may be obtained for five cents each, by addressing the "Commissioner of Patents, Washington, D. C."